(12) United States Patent
Spaulding et al.

(10) Patent No.: US 9,935,710 B2
(45) Date of Patent: Apr. 3, 2018

(54) SPATIALLY AND/OR DISTANCE DEFINED LIGHT-BASED COMMUNICATIONS IN A VEHICLE/ROADWAY ENVIRONMENT

(71) Applicants: Jeremy Spaulding, Marblehead, MA (US); Karlin Jessen, Reading, MA (US); Mervyn Anthony, Waltham, MA (US)

(72) Inventors: Jeremy Spaulding, Marblehead, MA (US); Karlin Jessen, Reading, MA (US); Mervyn Anthony, Waltham, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 13/947,172

(22) Filed: Jul. 22, 2013

(65) Prior Publication Data

US 2015/0025709 A1   Jan. 22, 2015

(51) Int. Cl.
*H04B 10/116* (2013.01)
*G08G 1/16* (2006.01)

(52) U.S. Cl.
CPC .......... *H04B 10/116* (2013.01); *G08G 1/163* (2013.01)

(58) Field of Classification Search
CPC ......... G08G 1/16; G08G 1/163; H04B 10/116
See application file for complete search history.

(56) References Cited

U.S. PATENT DOCUMENTS 6,765,495 B1 * 7/2004 Dunning et al. ............. 340/903
2010/0226645 A1   9/2010 van der Wateren et al.

OTHER PUBLICATIONS

Yashiro T., et al. "An Inter-vehicle Networking Method Using Laser Media", Vehicular Technology Conference, 1994 IEEE 44th Stockholm, Sweden Jun. 8-10, 1994, New York, NY, USA, IEEE, Jun. 8, 1994, pp. 443-447.
Ghilini, Marie, International Search Report and Written Opinion of the International Searching Authority, Oct. 22, 2014, pp. 1-12, European Patent Office, Rijswijk, the Netherlands.
Related PCT Application No. PCT/US2014/045892 filed on Jul. 9, 2014, Ghilini, Marie, International Search Report and Written Opinion of the International Searching Authority, Oct. 29, 2014, pp. 1-13, European Patent Office, Rijswijk, the Netherlands.

\* cited by examiner

*Primary Examiner* — Mussa A Shaawat
*Assistant Examiner* — Michael V Kerrigan
(74) *Attorney, Agent, or Firm* — Yutian Ling

(57) ABSTRACT

Techniques are disclosed for providing spatially-defined and/or distance-defined light-based communications within a vehicle/roadway environment. In some embodiments, the techniques can be used to vary the data content of a given transmitted light-based communications signal based on factors such as position, distance, and/or proximity of the transmitting source and the receiver. In some embodiments, the techniques can be used to vary the processing or other handling of a received light-based communications signal based on one or more of such factors. In some instances, the disclosed techniques can be utilized to tailor light-based vehicle-to-X (V2X) communications for dissemination between and among vehicles and infrastructure in a vehicle/roadway environment. To that end, a node may host a transmitter (e.g., laser, LED, or other solid-state light source) configured to emit such light-based communication signals and/or a receiver (e.g., a photosensor or other light-based data input device) configured to sense such signals.

23 Claims, 6 Drawing Sheets

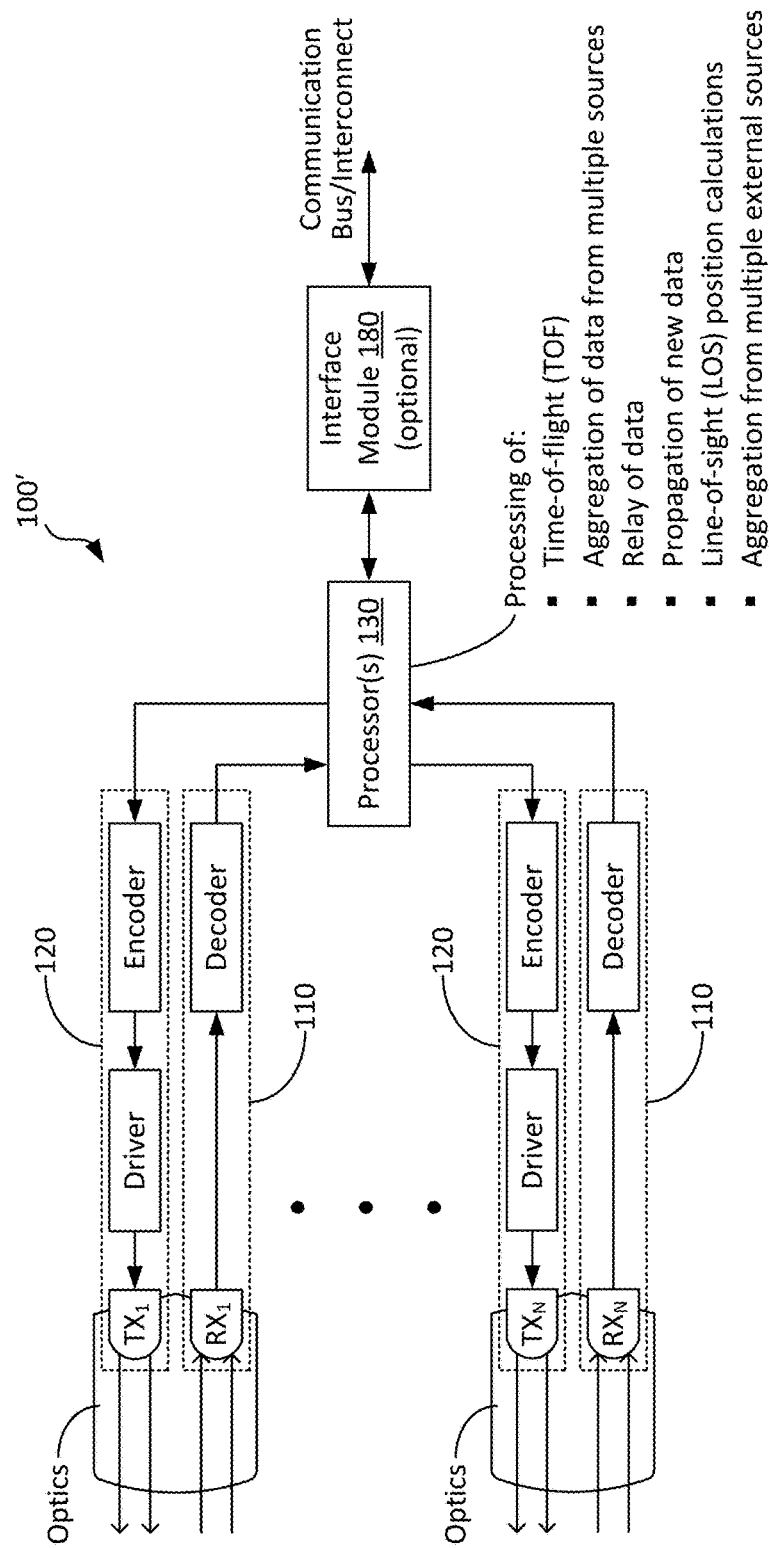

SPATIALLY AND/OR DISTANCE DEFINED LIGHT-BASED COMMUNICATIONS IN A VEHICLE/ROADWAY ENVIRONMENT

CROSS-REFERENCE TO RELATED APPLICATIONS

This application is related to U.S. patent application Ser. No. 13/947,181, filed on Jul. 22, 2013, which is herein incorporated by reference in its entirety.

FIELD OF THE DISCLOSURE

The disclosure relates to light-based communication systems, and more particularly to light-based communications within a vehicle/roadway environment using spatially-defined and/or distance-defined signals.

BACKGROUND

In a vehicle/roadway environment, current network topologies generally include cellular- and radio-based methods and traditional synchronized wireless networks. So-called vehicle-to-vehicle (V2V), vehicle-to-infrastructure (V2I), or vehicle-to-"X" (V2X) functionality can be used to transfer information within the vehicle/roadway environment. The information being transferred may be for a strategic communication (non-safety critical information) or a tactical communication (safety-critical and high-security information).

BRIEF DESCRIPTION OF THE DRAWINGS

FIG. 2B is a block diagram of a plurality of light-based communications systems operatively coupled with one another, in accordance with an embodiment of the present disclosure.

Figure 1A:
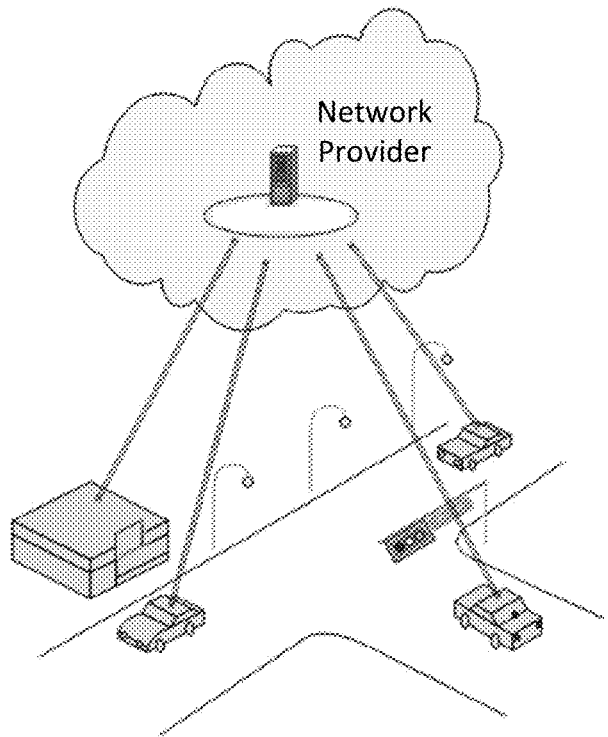
FIGS. 1A-1B illustrate radio-based wireless networks typically used for vehicle-to-X (V2X) communications in a vehicle/roadway environment.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

Techniques are disclosed for providing spatially and/or distance defined light-based communications within a vehicle/roadway environment. In some embodiments, the techniques can be used to vary the data content of a given transmitted light-based communications signal based on factors such as position, distance, and/or proximity of the transmitting source and the receiver. In some embodiments, the techniques can be used to vary the processing or other handling of a received light-based communications signal based on one or more of such factors. In some instances, the disclosed techniques can be utilized to tailor light-based vehicle-to-X (V2X) communications for dissemination between and among vehicles and infrastructure in a vehicle/roadway environment. To that end, a node may host a transmitter (e.g., laser, LED, or other solid-state light source) configured to emit such light-based communication signals and/or a receiver (e.g., a photosensor or other light-based data input device) configured to sense such signals. Numerous configurations and variations will be apparent in light of this disclosure.

GENERAL OVERVIEW

Figure 1B:
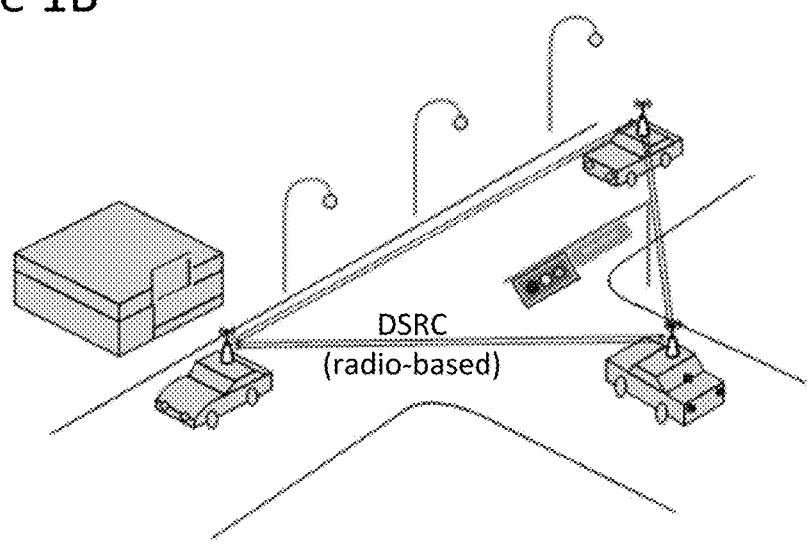

There are a number of non-trivial issues which complicate information dissemination within the vehicle/roadway environment. For example, current approaches to achieving vehicle-to-X (V2X) communications rely on existing radio-based wireless techniques. For instance, consider FIG. 1A, which illustrates a cellular phone-based wireless network typically used for V2X strategic communications in a vehicle/roadway environment, and FIG. 1B, which illustrates a Dedicated Short-Range Communications (DSRC) network typically used for V2X tactical communications in a vehicle/roadway environment. These existing radio-based communications techniques and their supporting synchronized mobile network topologies are limited in a number of ways. For example, existing radio-based communications systems are limited in terms of available bandwidth as shared/allocated based on system loading. Additionally, federal regulations limit radio-based communications in the vehicle/roadway environment to dedicated frequency spectra assigned, for example, by the Federal Communications Commission (FCC). Also, these existing approaches transfer data in an omnidirectional manner and thus do not resolve spatial information or transmit data to recipients in a particular direction. Instead, these radio-based signals are typically specially coded to resolve directional information and thus are not timely or sufficiently reliable for real-time inter-vehicle safety information. For instance, DSRC data is broadcast in a radio-based 360° field, and all recipients of information transmitted in this manner receive the same data. Therefore, the data is not tailored to the intended recipient, and significant post-processing, along with GPS location data, is required. Furthermore, existing communications network topologies rely on a relatively extensive dedicated radio-frequency infrastructure to serve the network and added specific hardware to form the network. The added cost and maintenance, particularly on the infrastructure side, can be prohibitive. Also, service provider limitations can contribute limitations. Additionally, existing approaches for resolving vehicle directional or positional information involve post-hoc processing from other data sources or positional computation, and this process does not occur in real time. In a more general sense, latency, availability, and reliability concerns associated with existing radio-based V2X communications approaches may make such techniques inadequate, particularly with respect to safety concerns.

Thus, and in accordance with an embodiment of the present disclosure, techniques are disclosed for providing spatially-defined and/or distance-defined light-based communications within a vehicle/roadway environment. For example, in some instances, the disclosed techniques can be used to vary the data content of a given transmitted light-based communications signal based on factors such as position, distance, and/or proximity of the transmitting source and the receiver. In some instances, the disclosed techniques can be used to vary the processing or other handling of a received light-based communications signal based on one or more of the same factors. In a more general sense, and in accordance with some embodiments, the disclosed techniques can be utilized to tailor light-based communications between and among vehicles and surrounding infrastructure based on spatial data.

In some cases, the disclosed techniques can be implemented as a light-based, peer-to-peer (P2P) communications network which interprets, prioritizes, and/or transmits information differently based on spatial and/or distance-related factors, such as position/orientation, physical proximity, distance, or other relative spatial variation of the transmitting source and/or receiver. In some embodiments, a network provided as described herein may include a plurality of mobile and/or fixed communicating nodes (peers) configured, for example, for light-based communications with one another. To that end, a given node may host one or more transmitters, such as a laser, light-emitting diode (LED), or other solid-state light source configured to emit light-based communication signals. Also, a given node may host one or more receivers, such as a photosensor or other light-based data input device configured to sense light-based communication signals. A given transmitter may be used to transmit data through a modulated (or otherwise modified) light spectrum to one or more receivers within line-of-sight, and those receivers may be used to collect that data. Note that a transmitter-receiver pair of a given node may be packaged as a transceiver. Also, and in accordance with some embodiments, transmission and/or reception of a given light-based communications signal within the network may be tailored based on any of the various types of spatial data discussed herein.

As will be appreciated in light of this disclosure, within a vehicle/roadway environment, vehicles generally may interact with other vehicles and infrastructure within immediate proximity using light-based communication. Thus, in this sense, the vehicle/roadway environment can be thought of as having a dynamic P2P nature, where each vehicle or surrounding infrastructure element may serve as a peer. Within such an environment, peers may disseminate information (e.g., pertaining to brake lights, stop lights, turn indicators, adjacent vehicle speed, following vehicle speed, etc.) with one another in relative proximity.

The disclosed techniques may be utilized, for example, to provide a P2P network of mobile and/or fixed nodes which use light-based signals to propagate tactical communications and/or strategic communications within that network. As used herein, tactical communications generally may refer to time- and/or position-sensitive information, such as that pertaining to safety or security applications, for instance, in the context of a vehicle on the roadway. Some examples include: time-to-collision; emergency braking; acceleration; adaptive cruise control; proximity sensing; lane departure; blind spot detection; crash response; intersection signal violation; pedestrian detection; obstacle detection; and the like. As discussed herein, such tactical communications may be utilized in performing functions within the vehicle/roadway environment such as: intersection assist; left- and right-turn assist; advance warning of a vehicle braking ahead; forward- and rearward-collision warning; blind-spot/lane-change warning; do-not-pass warning; etc. Also, as used herein, strategic communications generally may refer to information which is not as time- or position-sensitive. Some examples include: social networking; mapping; traveler/tourist information; landmarks/waypoints; toll collection; traffic monitoring; weather monitoring; emergency vehicle notifications; disaster-related notifications; AMBER alerts; and the like. In a more general sense, and in accordance with some embodiments, the disclosed techniques can be used to disseminate strategic and/or tactical communications within a vehicle/roadway environment, for example, as vehicle-to-vehicle (V2V) communications, vehicle-to-infrastructure (V2I) communications, and/or other vehicle-to-X (V2X) communications.

In accordance with some embodiments, a network provided as described herein may be configured to utilize the line-of-sight nature of light-based communication sources and the improvement of communication with proximity. Some embodiments may be utilized, for example, for transfer of small to medium-sized data sets in situations not requiring synchronized data transfer. However, the present disclosure is not so limited, as in a more general sense, a network provided as described herein can be customized to accommodate the dynamic and fluid nature of independent vehicle mobility in the vehicle/roadway environment. Also, in accordance with some embodiments, a network provided as described herein may be utilized to transmit communications data with other potentially desirable information, such as position/location, signal strength, time-of-flight (TOF), and/or relative heading/direction data of the transmitter and/or receiver. From the combination of these data types, there exists the potential to derive additional information, for example, depending upon physical proximity of the sources, relative velocity/acceleration, and/or location within the field-of-view (FOV). Some embodiments may utilize diversity across a broad spectrum or a multi-point approach (e.g., receivers in both forward lighting assemblies of a host vehicle), for example, to provide for discerning signals from noise and/or interference. Thus, and in accordance with an embodiment, the data transmitted can vary depending upon the transmitting source, the receiving source, the physical location of either, the present path of motion, and/or the proximity to another data source node. In some embodiments, a network provided as described herein may be configured to transfer tactical communications nearly instantaneously (e.g., with low latency), which may be desirable, for example, in the case of vehicle-following and collision-warning systems in vehicles which are at speed and in close proximity with one another. Other suitable uses of the disclosed techniques will depend on a given application and will be apparent in light of this disclosure.

Some embodiments may provide for unique data transfer between nodes simultaneously with other unique data transmission, for example, based on distance, position, and/or heading information. In some cases, this may provide for a true P2P style of data transmission (e.g., to a particularly desired target node as opposed to all available nodes) based on multiple transmission factors (e.g., distance, velocity, proximity, etc.). In some instances, this may realize benefits, for example, related to speed (e.g., which may be desirable for tactical or other time-sensitive communications), the omission of a service provider and thus avoidance of issues normally attendant therewith, and/or the omission of a central server. Also, some embodiments may provide for data propagation where information received from adjacent sources is prioritized as it is passed from one peer to another.

Some embodiments can be used to provide low-latency information transfer between communicating nodes within the vehicle/roadway environment. Some embodiments may realize an improvement, for example, in the efficiency with which proximate vehicles interact in the vehicle/roadway environment, thereby improving traffic flow. Also, some embodiments may realize an improvement over existing mobile data networks, for example, in the V2V communications context with regard to transfer of data requiring low latency in close-proximity situations (e.g., such as dynamic vehicle information that may activate or otherwise influence real-time safety systems).

Some embodiments may provide for data transfer leveraging the large bandwidth available in the light-based communication spectrum, which is significantly larger than cell-based communication or DSRC spectrums, is generally not regulated or is otherwise subject to fewer restrictions/approvals, and does not require a central network provider to be involved for functionality. Some embodiments may provide for light-based data transfer over free space and thus may be capable of very high data transfer rates, for example, with no need for added/specialized infrastructure or complex data processing (e.g., for point-to-point communications) services or hardware. To this end, some embodiments may utilize elements/components which already may be available at a given node. For example, SSL sources already installed on a given vehicle or infrastructure element may be utilized as a transmitter and/or receiver. Alternatively, a given node can be retrofitted with desired transmitter and/or receiver componentry, which is relatively less expensive than radio-based wireless communications hardware. For example, optical transmitter and/or receiver componentry may be installed within the lighting housings of a given vehicle or infrastructure element (e.g., daytime-running lights, fog lamps, sidelights, headlights, taillights, third brake lights, street lights, lighted signage, etc.). Some embodiments may be implemented without need for additional expensive dedicated hardware and supporting infrastructure for transmitting, processing, and/or receiving of communications signals (e.g., unlike the system elements needed in the existing radio-based approaches, discussed above). Also, some embodiments may provide for true P2P interaction, for example, without need to establish a Wi-Fi®-style synchronous connection or the associated network overhead.

System Architecture and Operation

Figure 2A:
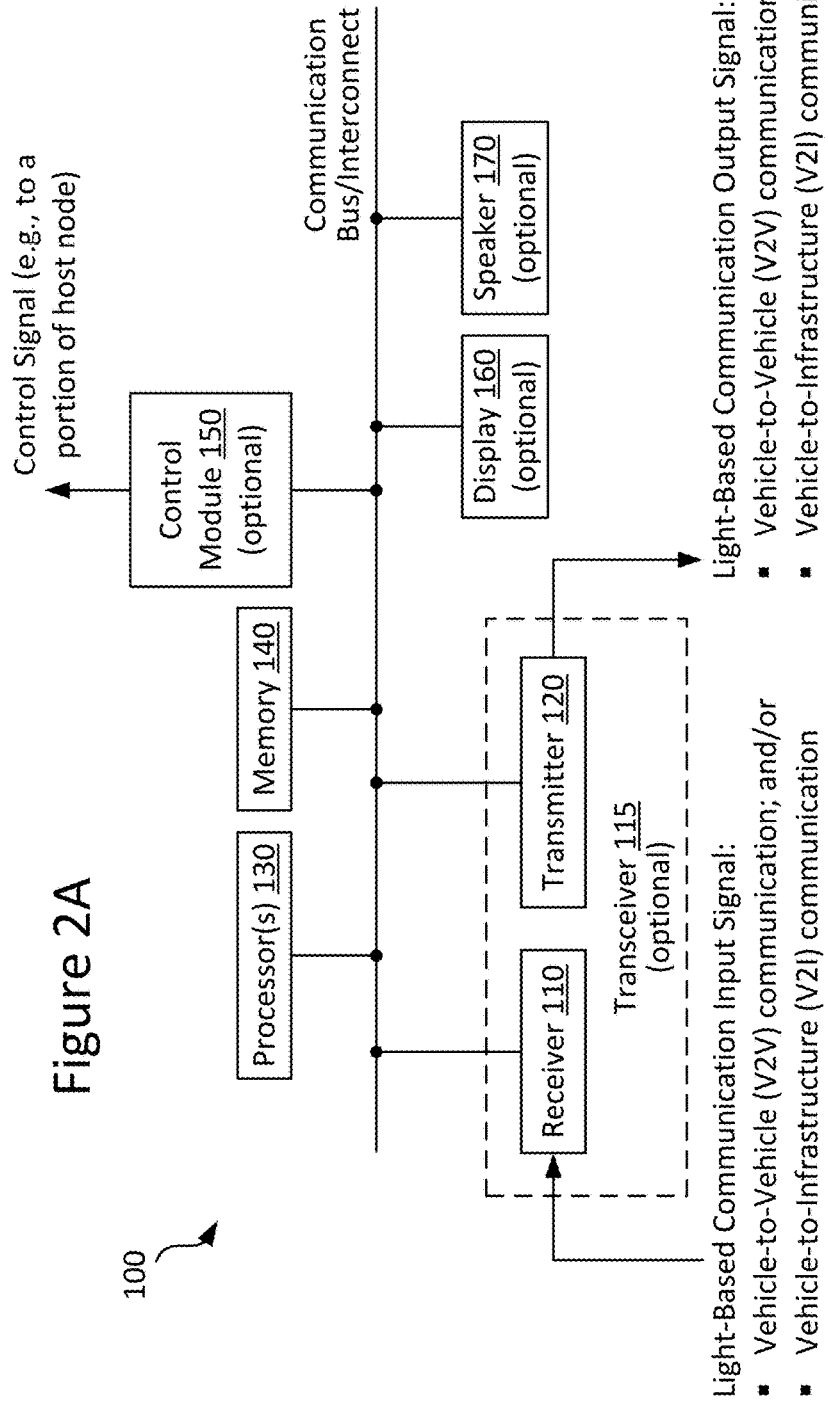
FIG. 2A is a block diagram of a light-based communications system configured in accordance with an embodiment of the present disclosure.

FIG. 2A is a block diagram of a light-based communications system 100 configured in accordance with an embodiment of the present disclosure. As discussed herein, system 100 may be configured for light-based communications with one or more other system(s) 100, for example, within line-of-sight. To that end, system 100 may include a number of modules operatively coupled with one another, including, for example, a receiver module 110, a transmitter module 120, processor(s) 130, and memory 140. As will be appreciated in light of this disclosure, in some cases, a receiver module 110 and a transmitter module 120 optionally may be combined into a transceiver module 115 having both receiver and transmitter capabilities. In some embodiments, system 100 optionally may include additional modules, such as, but not limited to, a control module 150, a display 160, and/or a speaker 170. In some instances, a plurality of systems 100 (e.g., a quantity ranging from 1-N) may be operatively coupled with one another to provide a system 100', such as is shown in FIG. 2B. In some such instances, it may be desirable to provide an optional interface module 180, for example, to assist with communication with other modules along the communication bus/interconnect.

In accordance with some embodiments, system 100 can be integrated or otherwise hosted, in part or in whole, by: (1) a mobile communicating node, such as a vehicle; and/or (2) a fixed communicating node, such as a traffic signal, a street light, illuminated signage on a building, etc. In some cases, system 100 can be provided with a distributed architecture and thus may have some degree of functional distributedness. Also, in some instances, a plurality of systems 100 hosted by a plurality of fixed and/or mobile communicating nodes may be capable of communicating with one another, for example, using light-based communications signals, thereby providing a light-based communications network. Numerous suitable configurations will be apparent in light of this disclosure.

In accordance with some embodiments, receiver 110 may be a photosensor or other light-based data input device configured to receive visible and/or non-visible light-based communication input signals. To that end, receiver 110 can be configured to sense wavelength(s) of interest from any spectral band (e.g., visible spectral band, infrared spectral band, ultraviolet spectral band, etc.), as desired for a given target application or end-use. Also, in some instances, receiver 110 may include one or more decoders, as desired. In accordance with an embodiment, receiver 110 can be configured to receive light-based communication signals from a given source from one or more directions (e.g., such as from a transmitter 120 of a second system 100 within line-of-sight of the receiver 110 of the first system 100). In some cases, and in accordance with an embodiment, receiver 110 can be a photosensor with which the host node may be retrofitted. In some embodiments, receiver 110 may be a SSL source device (e.g., such as any of the example devices discussed below with reference to transmitter 120) in its unpowered or off state.

In some instances, receiver 110 may be mounted on a movable platform or other suitable surface permitting it to be placed in a desired orientation. In some such instances, the movable receiver 110 may be reoriented based on the direction of incoming light-based communications signal(s) and processing of the received data may be adjusted as desired, for example, depending on the orientation of receiver 110. In some instances, receiver 110 may be a controllable array of photo-sensitive devices, which may be controlled based on the direction of incoming light-based communications signal(s), for example, so as to adjust processing as desired.

If the host node is a vehicle, for example, then receiver 110 may be integrated with the host vehicle, in accordance with some embodiments. For example, receiver 110 may be installed within one or more of the lighting housings (e.g., daytime-running lights, fog lamps, sidelights, headlights, taillights, third brake lights, etc.) of the host vehicle. Other suitable configurations for receiver 110 will depend on a given application and will be apparent in light of this disclosure.

In accordance with some embodiments, transmitter 120 may be a solid-state light (SSL) source or other light-based output device configured to output visible and/or non-visible light-based communication signals. To that end, transmitter 120 can be configured to emit wavelength(s) of interest from any spectral band (e.g., visible spectral band, infrared spectral band, ultraviolet spectral band, etc.), as desired for a given target application or end-use. For example, transmitter 120 may be a SSL device, such as, but not limited to, a light-emitting diode (LED), an organic light-emitting diode (OLED), a polymer light-emitting diode (PLED), a solid-state laser, and/or any combination thereof. In some cases, transmitter 120 may be, for example, a converted SSL device (e.g., phosphor over blue to provide a white LED). Also, in some instances, transmitter 120 may include one or more encoders and drivers, as desired. In accordance with an embodiment, transmitter 120 can be configured to output light-based communication signals in one or more directions (e.g., such as in the direction of a receiver 110 of a second system 100 within line-of-sight of the transmitter 120 of the first system 100). In some embodiments, transmitter 120 may include an array of SSL sources positioned, for example, on a complex surface or a plurality of surfaces such that the direction of transmission differs at different locations along the surface(s). In some cases, and in accordance with an embodiment, illumination of the individual SSL sources (e.g., diodes) of such an array may be varied, for example, depending on the type and/or content of the light-based communications output of transmitter 120. In some cases, and in accordance with an embodiment, transmitter 120 can be or otherwise utilize, in part or in whole, a SSL source which is already available on the host node. In some other cases, and in accordance with an embodiment, transmitter 120 can be a SSL source with which the host node may be retrofitted. In some instances, use of both existing SSL sources and retrofitted componentry may be provided.

In some instances, transmitter 120 may be mounted on a movable platform or other suitable surface permitting it to be placed in a desired orientation. In some such instances, the movable transmitter 120 may be reoriented based on the desired direction and/or data content of the outbound light-based communications signal(s) (e.g., a movable transmitter 120 may be reoriented depending on the location of a given receiver 110). In some instances, transmitter 120 may be a controllable array of SSL sources, which may be controlled based on the desired direction and/or data content of outbound light-based communications signal(s).

If the host node is a vehicle, for example, then transmitter 120 may be integrated with the host vehicle, in accordance with some embodiments. For example, transmitter 120 may be installed within any one or more of the lighting housings noted above with reference to receiver 110. In a more general sense, transmitter 120 may utilize any of a wide variety of SSL techniques and components. Other suitable configurations for transmitter 120 will depend on a given application and will be apparent in light of this disclosure.

In accordance with some embodiments, system 100 may include one or more processor(s) 130 configured to locally control functionality of one or more portions of system 100. For example, processor(s) 130 may be configured to: (1) process light-based communications signals received by a receiver 110; and/or (2) generate light-based communications signals to be emitted by a transmitter 120. A given processor 130 may be configured to perform any of a wide variety of functions, such as: calculating time-of-flight (TOF); aggregating data from multiple sources; relaying data; propagating new data; calculating line-of-sight (LOS) position; and/or aggregating data from multiple external sources. Also, in some cases, processor(s) 130 can be configured to determine whether and how to convey the information to an observer (e.g., such as by an operatively coupled display 160 and/or speaker 170). For instance, in some cases in which a display 160, discussed below, is optionally included, processor(s) 130 can be configured to decode and/or render images and graphics for display on a given display 160. In some cases in which a speaker 170, discussed below, is optionally included, processor(s) 130 can be configured to select and/or decode a particular tone or other sound to be emitted by speaker 170. In addition, processor(s) 130 may be configured to access and execute any of the modules stored within memory 140, discussed below. Other suitable configurations and capabilities of processor(s) 130 will depend on a given application and will be apparent in light of this disclosure.

In accordance with some embodiments, memory 140 can be configured to store system data on a temporary or permanent basis and may include volatile and/or non-volatile memory to that end. In some cases, memory 140 may be configured to store light-based communications data received and/or transmitted by system 100. Also, in some cases, memory 140 may be configured to store outbound light-based communications data (e.g., outbound light-based communications not yet transmitted). Furthermore, in some instances, memory 140 may be configured to store host node profile data (e.g., preferences/settings related to system 100 for the host node; a unique node ID for light-based communications purposes; etc.). Other types of data which it may be desirable to store within memory 140 will depend on a given application and will be apparent in light of this disclosure.

Also, memory 140 can include any number of modules stored therein that can be accessed and executed, for example, by the processor(s) 130. For example, in some instances, memory 140 may include a sound database module from which tones or other sounds to be emitted by a speaker 170 (when optionally included) may be retrieved. In some instances, memory 140 may include a data security module to encrypt/decrypt light-based communication signals received and/or transmitted by system 100. Other suitable modules which it may be desirable to store within memory 140 will depend on a given application and will be apparent in light of this disclosure.

The modules of memory 140 can be implemented, for example, in any suitable programming language, such as C, C++, objective C, JavaScript, custom or proprietary instruction sets, etc. The modules can be encoded, for example, on a machine-readable medium that, when executed by the processor, carries out the functionality of system 100, in part or in whole. The computer-readable medium may be any suitable non-transitory computing device memory that includes executable instructions, such as: a hard drive; a compact disk; a memory stick; and/or any combination thereof. Other embodiments may be implemented, for instance, with gate-level logic, an application-specific integrated circuit (ASIC) or chip set, or other such purpose-built logic. Some embodiments can be implemented with a microcontroller having input/output capability (e.g., inputs for receiving user inputs; outputs for directing other components) and a number of embedded routines for carrying out the system functionality. In a more general sense, the functional modules of memory 140 can be implemented in hardware, software, and/or firmware, as desired.

As previously noted, in some embodiments, system 100 optionally may include a control module 150. Control module 150 may be configured to output a control signal which may be used, for example, in controlling the operation of a portion of the host node. For example, if the host node is a vehicle, control module 150 may output a control signal to a given electronic control unit of the host vehicle, such as, but not limited to: the speed/cruise control unit; the brake control unit; the airbag control unit; etc. In a more general sense, control module 150 may output a signal to some portion of the host vehicle so as to cause a change in the operation of that receiving portion and thus effectuate a change in the operation of the host vehicle (e.g., for roadway safety, for fuel efficiency, etc.). Other suitable configurations and capabilities for optional control module 150 will depend on a given application and will be apparent in light of this disclosure.

Also, as previously noted, system 100 optionally may be configured to provide notifications or other feedback to an observer, in some embodiments. In some cases, system 100 may be configured to indicate that it has received and/or transmitted light-based communications data. In some instances, system 100 may be configured to indicate or otherwise provide an alert/notification to the observer that a given piece of received and/or transmitted communications data is particularly important or urgent. In some cases, notifications/alerts such as advance warning of a vehicle braking ahead, forward- and rearward-collision warning, blind-spot/lane-change warning, do-not-pass warning, etc., may be provided. In some cases, notification/feedback pertaining to a warning, alert, or other emergency notice (e.g., news/current events, traffic patterns, severe weather, emergency conditions/events, an evacuation procedure, etc.) may be provided by system 100. As will be appreciated, and in accordance with some embodiments, these and other notifications and feedback types may be utilized, for example, in performing functions within the vehicle/roadway environment such as, but not limited to, intersection assist, left- and right-turn assist, lane changes, detours/rerouting, etc. Other suitable forms of notifications/feedback will depend on a given application and will be apparent in light of this disclosure.

In accordance with some embodiments, system 100 may include or otherwise be configured to communicate with one or more displays 160 to provide visual notifications/feedback to an observer. A given display 160 may be configured such that, upon receipt and/or transmission of data by system 100, it displays a message, icon, color, or other visual indicator which conveys that data to the observer. To that end, a given display 160 can be any suitable display screen or other device on which images, video, text, or other visual content can be displayed, as will be apparent in light of this disclosure. In some cases, a given display 160 may be caused to display text, an image, a video, or other visual cue regarding the importance/urgency of a given light-based communication received or transmitted by system 100. If the host node is a vehicle, for example, then a given display 160 may be integrated with the host vehicle, in some embodiments. For example, display 160 may be part of the dashboard instrument panel or rearview mirror or may be an on-board display screen provided in the center console of the vehicle. In some other embodiments, a given display 160 may be a stand-alone component configured to communicate with one or more other portions of system 100 using any suitable wired (e.g., Universal Serial Bus or USB, Ethernet, FireWire, etc.) and/or wireless (e.g., Wi-Fi®, Bluetooth®, etc.) communications. Other suitable configurations and capabilities for optional display 160 will depend on a given application and will be apparent in light of this disclosure.

In accordance with some embodiments, system 100 may include or otherwise be configured to communicate with one or more speakers 170 to provide aural notifications/feedback to an observer. A given speaker 170 may be configured such that, upon receipt and/or transmission of data by system 100, it emits a tone, music, recorded vocals, or other aural indicator which conveys the data to the observer. To that end, a given speaker 170 can be any suitable speaker or other device from which sound can be transmitted, as will be apparent in light of this disclosure. In some cases, a given speaker 170 may be caused to vary the type, pattern, and/or intensity of sound emitted thereby to signify the importance/urgency of a given light-based communication received or transmitted by system 100. If the host node is a vehicle, for example, then a given speaker 170 may be integrated with the host vehicle, in some embodiments. For example, speaker 170 may be part of the audio system provided in the vehicle. In some other embodiments, a given speaker 170 may be a stand-alone component configured to communicate with one or more other portions of system 100 using any of the wired and/or wireless communications noted above with respect to optional display 160.

As will be appreciated in light of this disclosure, in some cases, system 100 may be configured to employ multiple types of notification/feedback simultaneously. For example, display 160 may display a received communications message while speaker 170 emits a recorded vocal of that message. Numerous suitable techniques for providing notifications/feedback will be apparent in light of this disclosure.

In accordance with some embodiments, the data content of a given light-based communications signal emitted by a given transmitter 120 may be varied based on one or more spatially and/or distance-related factors. Some example such factors include: position/orientation of the transmitter 120; position/orientation of a given target receiver 110; distance between the transmitter 120 and a given target receiver 110; proximity of a given target receiver 110 to the transmitter 120; location/global heading of the transmitter 110; and the like. In some instances, such spatially and/or distance-related factors may be defined, in part or in whole, using spatial measurement data, such as a change in distance ($\Delta D$), a change in lateral direction ($\Delta L$), a change in height/elevation, and/or a change in velocity ($\Delta V$), among others. Other suitable spatially and/or distance-related factors which may be utilized in varying the data content of a given transmitted light-based communication output by a given transmitter 120 will depend on a given application and will be apparent in light of this disclosure.

As previously discussed, a given transmitter 120 may be configured to emit one or more light-based communications signals simultaneously to one or more receivers 110 within line-of-sight. To that end, a given transmitter 110 may include a controllable array of transmitting SSL sources, a movable transmitting SSL source, or a combination thereof, in accordance with some embodiments. By virtue of this, a given transmitter 120 may be capable, in accordance with some embodiments, of broadcasting or otherwise emitting multiple unique strings of data (e.g., to be received by a plurality of target receivers 110).

Figure 3:
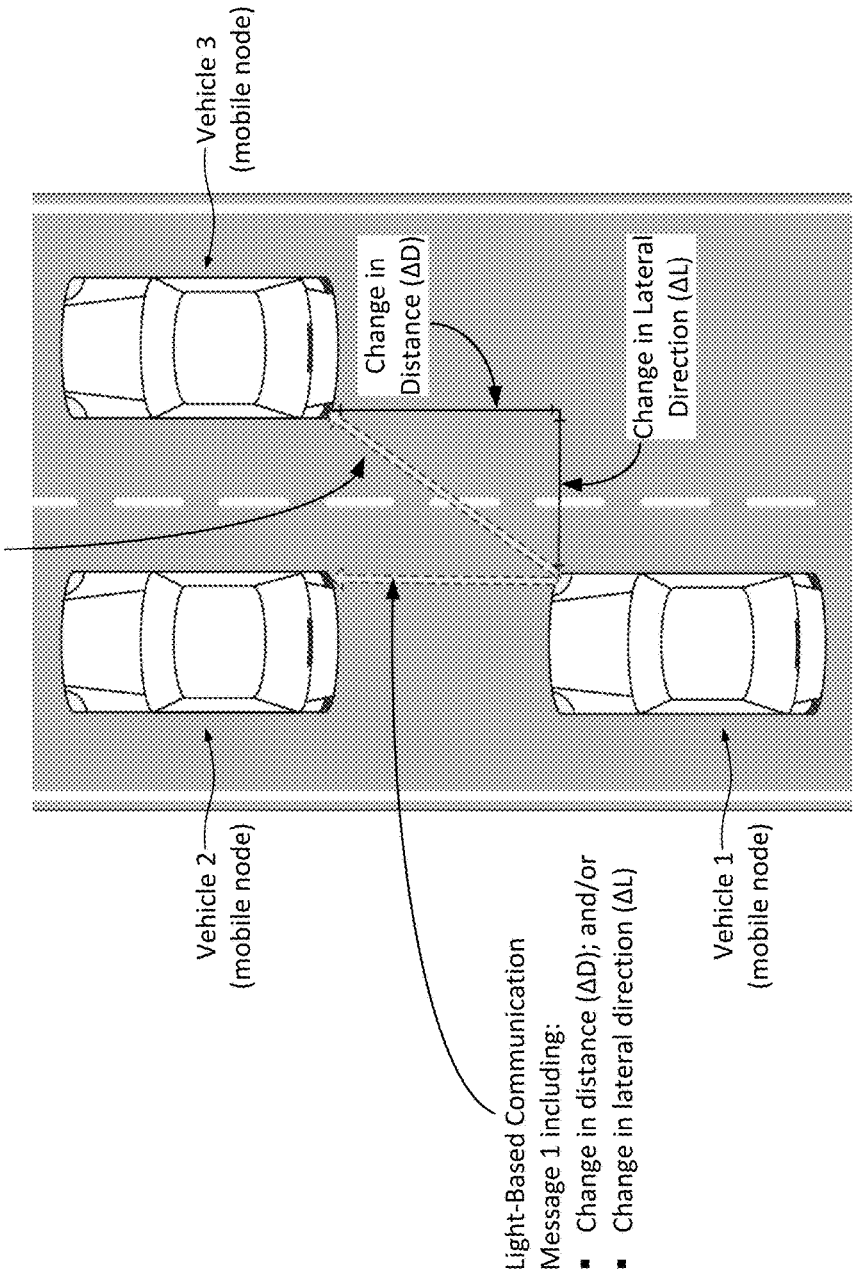
FIG. 3 illustrates an example scenario of spatially and/or distance defined transmission of light-based communications in a vehicle/roadway environment, in accordance with an embodiment of the present disclosure.

FIG. 3 illustrates an example scenario of spatially and/or distance defined transmission of light-based communications in a vehicle/roadway environment, in accordance with an embodiment of the present disclosure. As can be seen, the depicted example scenario shows three mobile communicating nodes (Vehicles 1, 2, and 3); however, any quantity and type of nodes may be provided, in accordance with other embodiments. In any case, each node may host a system 100 (in part or in whole) and thus may be capable of sending and/or receiving light-based communications data, as described herein. Here, Vehicle 1 approaches Vehicle 2 and Vehicle 3 from behind. Vehicle 2 is positioned directly in front of Vehicle 1 at a distance $\Delta D$, and Vehicle 3 is positioned in front of Vehicle 1 at a distance $\Delta D$ in the adjacent lane at a change in lateral direction $\Delta L$. As it approaches, Vehicle 1 transmits light-based information to each of Vehicle 2 and Vehicle 3 in real time. In this example case, Vehicle 1 transmits Light-Based Communication Message 1 in one direction to Vehicle 2, while also transmitting Light-Based Communication Message 2 in a different direction to Vehicle 3. The two data signals are received at approximately the same time by Vehicle 2 and Vehicle 3.

In accordance with an embodiment, Light-Based Communication Message 1 (received by Vehicle 2) may include data content which is different from that of Light-Based Communication Message 2 (received by Vehicle 3) depending, for example, on one or more of the spatially and/or distance-related factors discussed above. Here in FIG. 3, Vehicle 2 may receive Light-Based Communication Message 1 including a first data string indicating, for example, that "a vehicle is approaching from behind at 65 mph." Vehicle 3 may receive Light-Based Communication Message 2 including a data string indicating, for example, that "a vehicle is in the blind zone on the driver's side, approaching at 65 mph." The difference may be provided, for instance, based on the difference in data content between Message 1 and Message 2 (e.g., Message 1 may include data pertaining to the speed of Vehicle 1, whereas Message 2 may include data pertaining to the speed and relative position of Vehicle 1). Other suitable applications for varying the data content of a given light-based communication using the disclosed techniques will be apparent in light of this disclosure.

In accordance with some embodiments, processing or other handling (e.g., prioritizing, combining, relaying, etc.) of a given light-based communications signal received by a given receiver 110 may be varied based on one or more of the example spatially and/or distance-related factors noted above. By virtue of this, a given receiver 110 may be capable, in accordance with some embodiments, of processing information differently depending upon the origin of that information (e.g., where the transmitting source is located). In some instances, a given receiver 110 may be capable of interpreting different portions of spatially and/or distance-related data of a given light-based communications signal to different ends/objectives.

Figure 4:
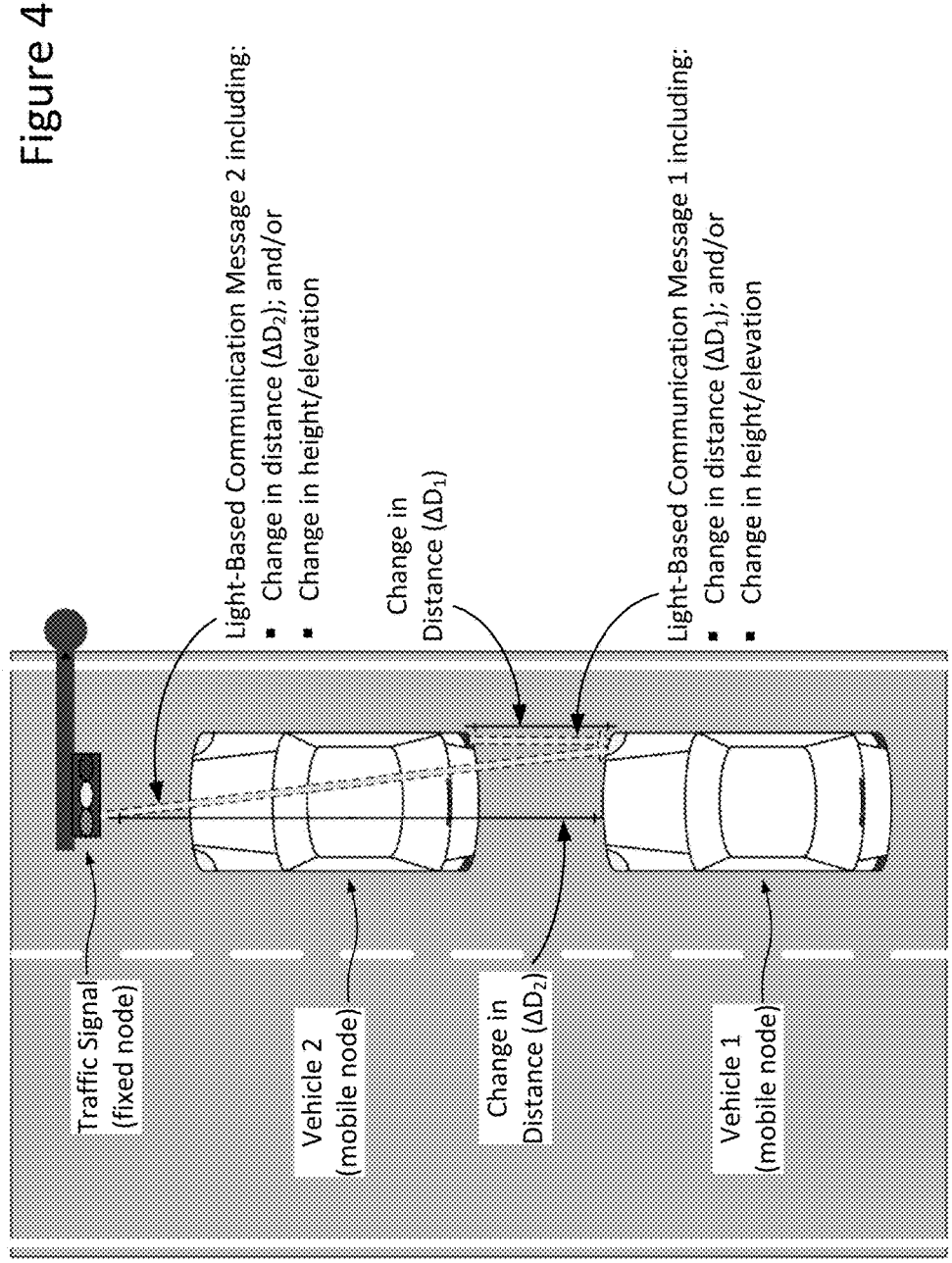
FIG. 4 illustrates an example scenario of spatially and/or distance defined reception of light-based communications in a vehicle/roadway environment, in accordance with an embodiment of the present disclosure.

FIG. 4 illustrates an example scenario of spatially and/or distance defined reception of light-based communications in a vehicle/roadway environment, in accordance with an embodiment of the present disclosure. As can be seen, the depicted example scenario shows two mobile communicating nodes (Vehicles 1 and 2) and one fixed communicating node (Traffic Signal); however, any quantity and type of nodes may be provided, in accordance with other embodiments. In any case, each node may host a system 100 (in part or in whole) and thus may be capable of sending and/or receiving light-based communications data. Here, Vehicle 1 approaches Vehicle 2 from behind at a Traffic Signal. Vehicle 2 is positioned directly in front of Vehicle 1 at a distance $\Delta D_1$, and the Traffic Signal is positioned in front of Vehicle 1 (ahead of Vehicle 2) at a farther distance $\Delta D_2$. As it approaches, Vehicle 1 receives light-based information from each of Vehicle 2 and the Traffic Signal in real time. In this example case, Vehicle 2 transmits Light-Based Communication Message 1 to Vehicle 1, while the Traffic Signal simultaneously transmits Light-Based Communication Message 2 to Vehicle 1. The two data signals are received at approximately the same time by Vehicle 1.

In accordance with an embodiment, Light-Based Communication Message 1 and Light-Based Communication Message 2 may be processed or otherwise handled differently by Vehicle 1, for example, depending on one or more spatially and/or distance-related factors (discussed above) associated therewith. Here in FIG. 4, Light-Based Communication Message 1 may be given priority for processing and any resultant action, for example, because it was transmitted from a source (e.g., Vehicle 2) at a nearer distance (e.g., $\Delta D_1$) and/or because it is vehicle-related information (e.g., particularly if it is safety-related data). Light-Based Communication Message 2 may be subsequently processed, for example, because it was transmitted from a source (e.g., the Traffic Signal) at a farther distance (e.g., $\Delta D_2$) or different elevation (e.g., change in height) and/or because it is infrastructure-related information. Other suitable applications for varying the processing or other handling of a given light-based communication using the disclosed techniques will be apparent in light of this disclosure As previously discussed, in some cases, a plurality of systems 100 (e.g., a quantity ranging from 1-N) may be operatively coupled with one another to provide a system 100', such as is shown in FIG. 2B. In some such cases, it may be desirable to ensure that the transmitters 120 and/or receivers 110 of those systems 100 are configured to be oriented in a variety of different directions, for example, to facilitate the ability of system 100' to receive and/or transmit spatially and/or distance defined light-based communications signals, as described herein. In some instances, the optics of a given portion of system 100' may be customized to that end.

In an example case, if the position/orientation of a host node, and thus a transmitter 120 hosted thereby, were to change (e.g., gradually, dramatically, or otherwise), then the transmitter 120 may emit a different signal to one or more nearby target receivers 110. In another example case, a transmitter 120 hosted by a first node may emit different signals to one or more nearby target receivers 110, for instance, based on their relative proximities with the transmitter 120. In another example case, the relevance of a received signal may be determined by a given receiver 110, for instance, based on how proximal it is to the source transmitter 120. In another example case, multiple signals received over a period of time may be used, for example, to alter the time-to-collision of a proximal vehicle depending upon that vehicle's position and/or speed over an interval. Numerous suitable uses/applications will be apparent in light of this disclosure.

Also, as previously discussed, a system 100 including a receiver 110 can be capable of sensing light emitted by a given light source, in accordance with some embodiments. Thus, as will be appreciated in light of this disclosure, receiver 110 need not be limited to sensing light emitted only by a transmitter 120. That is, a receiver 110 may be capable of sensing light emitted from any of a wide variety of sources that may be found within the vehicle/roadway environment, such as brake lights, turn signals, traffic signals, etc., but which need not necessarily host a system 100 (in part or in whole). Therefore, system 100 may be capable of deriving various types of information from the light emitted by a given light source within such an environment, in accordance with some embodiments. Some such information may relate, for example, to safety-related considerations. For instance, data pertaining to the light source, such as its position within the FOV of the receiver 110 or one or more characteristics of the light emitted by such source (e.g., wavelength/color, amplitude/intensity, emission pattern, etc.) may be interpreted to determine the status of that light source (e.g., reverse lights are white, brakes lights are a higher intensity red than running lights, a turn signal flashes, etc.). Some example cases include: determining that a nearby vehicle is braking, potentially turning, or backing up;

determining that a roadway control device has changed its signal; determining that an emergency vehicle with flashing lights of particular colors is approaching; and the like. Also, a given light source may be set at one or more specific lighting output frequencies (e.g., the red color in tail lights, the amber color in turn signals, etc.) and thus may produce relatively unique spectra, which a given receiver 110 may be configured to readily identify, in accordance with some embodiments. Other suitable uses will depend on a given application and will be apparent in light of this disclosure.

Methodologies

Figure 5:
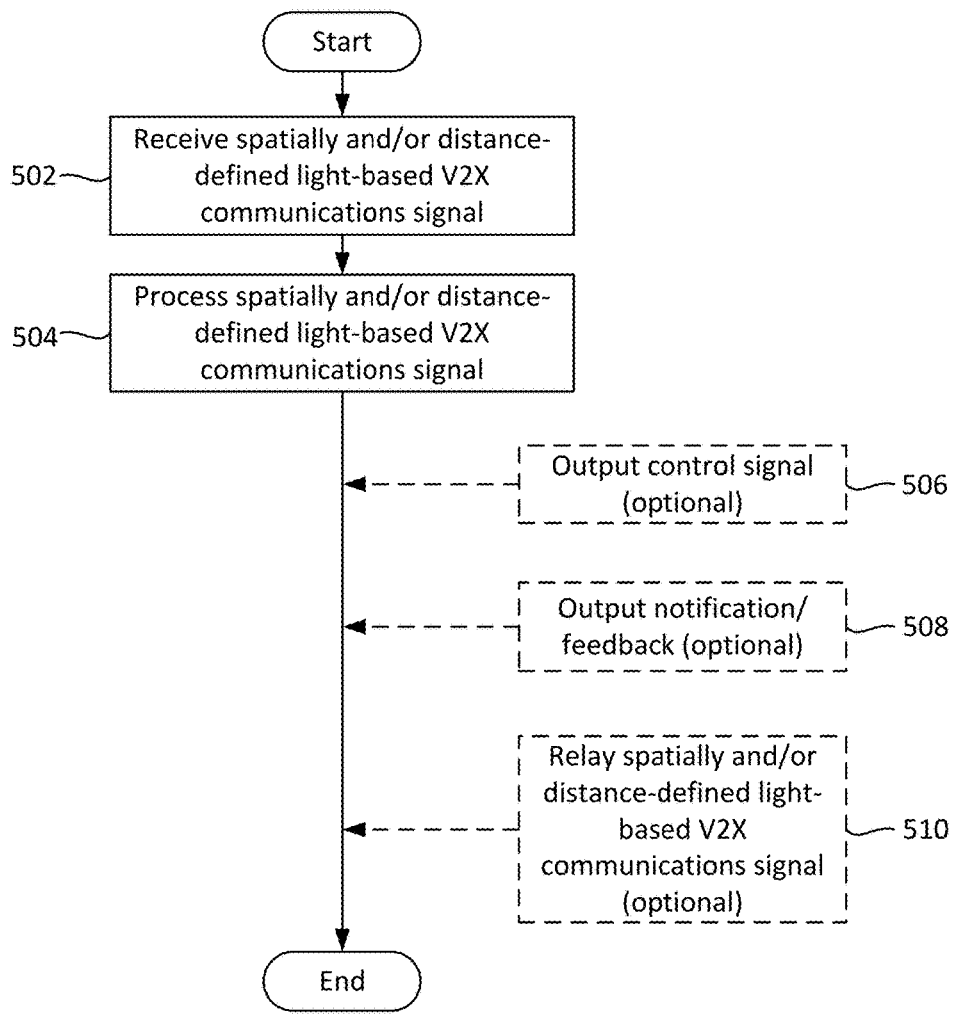
FIG. 5 is a flow diagram illustrating a process of light-based communication using spatially and/or distance defined signals, in accordance with an embodiment of the present disclosure.

FIG. 5 is a flow diagram illustrating a process of light-based communication using spatially and/or distance defined signals, in accordance with an embodiment of the present disclosure. The flow may begin as in block 502 with receiving a spatially and/or distance defined light-based V2X communications signal. As discussed above, receiver 110 (or transceiver 115, if provided) may be configured to receive the light-based V2X communications signal, in accordance with an embodiment. The signal may come from any of a number of sources, such as, for example, a transmitter 120 of another system 100 (e.g., as hosted by another mobile or fixed communicating node) within line-of-sight of that receiver 110. As previously noted, and in accordance with some embodiments, the received signal may include data pertaining to one or more spatially and/or distance-related factors, including: position/orientation of the transmitter 120; position/orientation of a given target receiver 110; distance between the transmitter 120 and a given target receiver 110; proximity of a given target receiver 110 to the transmitter 120; location/global heading of the transmitter 110; and the like.

The flow may continue as in block 504 with processing the spatially and/or distance defined light-based V2X communications signal. As discussed above, one or more processors 130 may be configured to operate to that end. Processing of the received light-based communications signal may entail, for example, interpreting data accompanying the signal and pertaining to one or more of the spatially and/or distance-related factors. For example, data pertaining to a change in distance (ΔD), a change in lateral direction (ΔL), a change in elevation/height, a change in velocity (ΔV), etc., may be utilized in interpreting, combining, prioritizing, and/or otherwise handling the received light-based communications signal. In some instances, processor(s) 130 may serve to aggregate and/or relay a given spatially and/or distance defined light-based V2X communications signal. In some cases, processing further may entail determining whether and how to convey the received communications to an observer (e.g., such as by an operatively coupled display 160 and/or speaker 170). In some cases in which a display 160 is included, processor(s) 130 can be configured to decode and/or render the image, video, message, icon, or other visual indicator to be displayed by display 160. In some cases in which a speaker 170 is included, processor(s) 130 can be configured to select and/or decode the tone, music, recorded vocals, or other aural indicator to be emitted by speaker 170.

In some cases, the flow optionally may continue as in block 506 with outputting a control signal to a portion of the host node. As discussed above, when included with system 100, optional control module 150 may be configured to operate to that end, in accordance with an embodiment. As previously noted, the control signal can be used, for example, to control the operation of some portion(s) of the host node. If the host node is a vehicle, for example, the control signal may be provided to a given electronic control unit thereof (e.g., speed/cruise control unit, brake control unit, airbag control unit, etc.). Other suitable uses of the one or more optional control signals will depend on a given application and will be apparent in light of this disclosure.

In some cases, the flow optionally may continue as in block 508 with outputting a notification or other feedback. As discussed above, when included with system 100, an optional display 160 and/or speaker 170 may be configured to operate to that end, in accordance with some embodiments. In some cases in which a display 160 is included, an image, video, message, icon, or other visual indicator which conveys the V2X communications data may be provided. In some cases in which a speaker 170 is included, a tone, music, recorded vocals, or other aural indicator which conveys the V2X communications data may be provided. In some instances, visual and aural notifications/feedback may be provided simultaneously by system 100 to manifest an appropriate or otherwise desired notification, alert, or feedback.

In some cases, the flow optionally may continue as in block 510 with relaying the spatially and/or distance defined light-based V2X communications signal. As discussed above, the node hosting a receiver 110 also may host a transmitter 120, in some cases, which may be configured to relay the signal for downstream use (e.g., to another node, back to the node from which the signal originated, etc.). The relayed signal may be directed in any desired direction, such as, for example, in the direction of a receiver 110 of another system 100 (e.g., as hosted by another mobile or fixed communicating node) within line-of-sight of that transmitter 120. In some instances, the relayed signal may include data regarding one or more spatially and/or distance-related factors pertaining to the node from which the signal originated and/or the node which is relaying the signal. In some specific such instances, the light-based V2X communications signal may comprise an aggregated or otherwise relayed set of strategic and/or tactical V2X communications and attendant spatially and/or distance-related data from multiple source nodes.

Numerous variations on this process will be apparent in light of this disclosure. As will be appreciated, and in accordance with an embodiment, each of the functional boxes (e.g., 502, 504, 506, 508, and 510) shown in FIG. 5 can be implemented, for example, as a module or sub-module that, when executed by one or more processors or otherwise operated, causes the associated functionality as described herein to be carried out. The modules/sub-modules may be implemented, for instance, in software (e.g., executable instructions stored on one or more computer-readable media), firmware (e.g., embedded routines of a microcontroller or other device which may have input/output capacity for soliciting input from a user and providing responses to user requests), and/or hardware (e.g., gate-level logic, field-programmable gate array, purpose-built silicon, etc.).

Numerous embodiments will be apparent in light of this disclosure. One example embodiment of the present invention provides a method of light-based communication within a vehicle/roadway environment, the method including: receiving, at a first node, a first spatially and/or distance defined light-based communication signal; and processing the first spatially and/or distance defined light-based communication signal at the first node. In some cases, the first spatially and/or distance defined light-based communication signal comprises a vehicle-to-X (V2X) communication. In some cases, the V2X communication comprises a vehicle-to-vehicle (V2V) communication including at least one of tactical communication data and/or strategic communication data. In some cases, the V2X communication comprises a vehicle-to-infrastructure (V2I) communication including at least one of tactical communication data and/or strategic communication data. In some instances, the first spatially and/or distance defined light-based communication signal includes data pertaining to at least one of a position of the first node relative to a second node, a location of the first node within a network, a strength of the first spatially and/or distance defined light-based communication signal, a time-of-flight (TOF) of the first spatially and/or distance defined light-based communication signal, and/or a heading of the first node relative to a second node. In some instances, after processing the first spatially and/or distance defined light-based communication signal at the first node, the method further includes: relaying the first spatially and/or distance defined light-based communication signal from the first node to a second node. In some instances, after processing the first spatially and/or distance defined light-based communication signal at the first node, the method further includes: transmitting a second spatially and/or distance defined light-based communication signal from the first node to a second node, wherein the second spatially and/or distance defined light-based communication signal is inclusive of the first spatially and/or distance defined light-based communication signal and additional data received from the first node. In some cases, the first node comprises a vehicle, and, after processing the first spatially and/or distance defined light-based communication signal at the first node, the method further includes: outputting a control signal to control a vehicle function. In some instances, after processing the first spatially and/or distance defined light-based communication signal at the first node, the method further includes: outputting a notification to at least one of a display hosted by the first node and/or a speaker hosted by the first node. In some cases, the first spatially and/or distance defined light-based communication signal comprises data pertaining to at least one of: a position/orientation of a transmitter from which the spatially and/or distance defined light-based communication signal originated; a position/orientation of a receiver hosted by the first node; a distance between a transmitter from which the spatially and/or distance defined light-based communication signal originated and a receiver hosted by the first node; a proximity of a receiver hosted by the first node to a transmitter from which the spatially and/or distance defined light-based communication signal originated; and/or a location/global heading of a transmitter from which the spatially and/or distance defined light-based communication signal originated.

Another example embodiment of the present invention provides a light-based communications system including: a receiver configured to sense incoming spatially and/or distance defined light-based vehicle-to-X (V2X) communication signals; a transmitter configured to emit spatially and/or distance defined light-based vehicle-to-X (V2X) communication signals; and a processor configured to at least one of: process incoming spatially and/or distance defined light-based vehicle-to-X (V2X) communication signals sensed by the receiver; and/or process outgoing spatially and/or distance defined light-based vehicle-to-X (V2X) communication signals emitted by the transmitter. In some cases, the receiver comprises a photosensor and the transmitter comprises at least one of a solid-state laser and/or one or more light-emitting diodes (LEDs). In some instances, the system further includes a control module configured to output a control signal associated with a vehicle function. In some cases, the system further includes at least one of a display configured to display a visual notification provided by the processor and/or a speaker configured to emit an aural notification provided by the processor. In some instances, a vehicle including the system is provided.

Another example embodiment of the present invention provides A light-based vehicle-to-X (V2X) communications system including: a first node configured to output a spatially and/or distance defined light-based V2X communication; and a second node configured to receive and process the spatially and/or distance defined light-based V2X communication; wherein at least one of the first node and/or second node comprises a fixed node on a roadway. In some cases, at least one of the first node and/or second node comprises a traffic signal, a street light, or an electroluminescent sign. In some instances, one of the first node or second node comprises a vehicle. In some cases, the V2X communication comprises a vehicle-to-vehicle (V2V) communication including at least one of tactical communication data and/or strategic communication data. In some cases, the V2X communication comprises a vehicle-to-infrastructure (V2I) communication including at least one of tactical communication data and/or strategic communication data. In some instances, the V2X communication comprises at least one of tactical communication data and/or strategic communication data and further comprises data pertaining to at least one of a position of the first node relative to the second node, a location of the first node, a strength of the spatially and/or distance defined light-based communication signal, a time-of-flight (TOF) of the spatially and/or distance defined light-based communication signal, and/or a heading of the first node relative to the second node. In some instances, output of the spatially and/or distance defined light-based communication by the first node is provided by a transmitter hosted by the first node, and receipt of the spatially and/or distance defined light-based communication by the second node is provided by a receiver hosted by the second node. In some cases, the receiver comprises a photosensor and the transmitter comprises at least one of a solid-state laser and/or one or more light-emitting diodes (LEDs).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method of light-based communication within a vehicle or roadway environment, the method comprising:
   receiving, at a receiver of a first vehicle, a first spatially and/or distance defined light-based communication signal;
   receiving, at the receiver of the first vehicle, a second spatially and/or distance defined light-based communication signal;
   processing the first spatially and/or distance defined light-based communication signal at the first vehicle, wherein the first spatially and/or distance defined light-based communication signal includes data pertaining to at least one of a position of the first vehicle relative to a second vehicle, a time-of-flight (TOF) of the first spatially and/or distance defined light-based communication signal, or a heading of the first vehicle relative to a second vehicle;
   processing the second spatially and/or distance defined light-based communication signal at the first vehicle, wherein the second spatially and/or distance defined light-based communication signal includes data pertaining to at least one of a position of the first vehicle relative to a third vehicle, a time-of-flight (TOF) of the second spatially and/or distance defined light-based communication signal, or a heading of the first vehicle relative to a third vehicle;

transmitting, by a transmitter of the first vehicle, a first message to the second vehicle, the first message based at least in part on the first spatially and/or distance defined light-based communication signal;

transmitting, by the transmitter of the first vehicle, a second message to the third vehicle, the second message based at least in part on the second spatially and/or distance defined light-based communication signal, the second message being different than the first message;

receiving, at the receiver of the first vehicle, light emitted from a light source within an environment around the vehicle, wherein the light source is not part of a light-based communication system; and determining a status of the light source from one or more characteristics of the light emitted from the light source, wherein the one or more characteristics comprise at least one of wavelength, color, amplitude, intensity, and emission pattern;

wherein the transmitter of the first vehicle includes an array of individual light sources disposed on a complex surface, and the first and second messages are directionally transmitted by illuminating different individual light sources of the array.

2. The method of claim 1, wherein first message includes data pertaining to the speed of the first vehicle, and the second message includes data pertaining to the speed and relative position of the first vehicle.

3. The method of claim 1, further comprising prioritizing processing of the first and second spatially and/or distance defined light-based communication signals based at least in part on the data included in those signals.

4. The method of claim 1, wherein the first message and the second message are transmitted simultaneously.

5. The method of claim 1, wherein after processing the first spatially and/or distance defined light-based communication signal at the first vehicle, the method further comprises:
relaying the first spatially and/or distance defined light-based communication signal from the first vehicle to another vehicle.

6. The method of claim 1, wherein after processing the first spatially and/or distance defined light-based communication signal at the first vehicle, the method further comprises:
transmitting a third spatially and/or distance defined light-based communication signal from the first vehicle to a another vehicle, wherein the third spatially and/or distance defined light-based communication signal is inclusive of the first spatially and/or distance defined light-based communication signal and additional data received from the first vehicle.

7. The method of claim 1, wherein after processing the first spatially and/or distance defined light-based communication signal at the first vehicle, the method further comprises:
outputting a control signal to control a vehicle function.

8. The method of claim 1, wherein after processing the first spatially and/or distance defined light-based communication signal at the first vehicle, the method further comprises:

outputting a notification to at least one of a display hosted by the first vehicle and/or a speaker hosted by the first vehicle.

9. The method of claim 1, wherein the first spatially and/or distance defined light-based communication signal comprises data pertaining to at least one of:
a position and orientation of a transmitter from which the spatially and/or distance defined light-based communication signal originated;
a position/orientation of a receiver hosted by the first vehicle;
a distance between a transmitter from which the spatially and/or distance defined light-based communication signal originated and a receiver hosted by the first vehicle;
a proximity of a receiver hosted by the first vehicle to a transmitter from which the spatially and/or distance defined light-based communication signal originated; and/or
a heading of a transmitter from which the spatially and/or distance defined light-based communication signal originated.

10. A light-based communications system comprising:
a receiver configured to sense incoming spatially and/or distance defined light-based vehicle-to-X (V2X) communication signals and to sense emitted light from a light source within an environment around the system, wherein the light source is not part of a light-based communication system;
a transmitter configured to emit spatially and/or distance defined light-based vehicle-to-X (V2X) communication signals, the transmitter including an array of individual light sources disposed on a complex surface; and
a processor configured to:
determine a status of the light source from one or more characteristics of the light emitted from the light source, wherein the one or more characteristics comprise at least one of wavelength, color, amplitude, intensity, and emission pattern;
process incoming spatially and/or distance defined light-based vehicle-to-X (V2X) communication signals sensed by the receiver;
process outgoing spatially and/or distance defined light-based vehicle-to-X (V2X) communication signals emitted by the transmitter, the outgoing spatially and/or distance defined light-based vehicle-to-X (V2X) communication signals including:
a first message to the first vehicle, the first message based at least in part on a first incoming spatially and/or distance defined light-based communication signal; and
a second message to the second vehicle, the second message based at least in part on a second incoming spatially and/or distance defined light-based communication signal, the second message being different than the first message;
wherein the first and second messages are directionally transmitted by illuminating different individual light sources of the array.

11. The system of claim 10, wherein the receiver comprises a photosensor and the transmitter comprises at least one of a solid-state laser and/or one or more light-emitting diodes (LEDs).

12. The system of claim 10 further comprising a control module configured to output a control signal associated with a vehicle function.

13. The system of claim 10 further comprising at least one of a display configured to display a visual notification provided by the processor and/or a speaker configured to emit an aural notification provided by the processor.

14. A vehicle comprising the system of claim 10.

15. The method of claim 1, further comprising:
receiving, at the receiver of the first vehicle, a third spatially and/or distance defined light-based communication signal; and
processing the third spatially and/or distance defined light-based communication signal at the first vehicle, wherein the third spatially and/or distance defined light-based communication signal includes data pertaining to at least one of a position of the first vehicle relative to a fixed node, a time-of-flight (TOF) of the third spatially and/or distance defined light-based communication signal, or a heading of the first vehicle relative to a fixed node, wherein the fixed node is one of a traffic signal, a street light, or an electroluminescent sign.

16. A computer program product including one or more non-transitory machine readable mediums encoded with instructions that when executed by one or more processors cause a process to be carried out for light-based communication within a vehicle or roadway environment, the process comprising:
processing, at a first vehicle, a first spatially and/or distance defined light-based communication signal, wherein the first spatially and/or distance defined light-based communication signal includes data pertaining to at least one of a position of the first vehicle relative to a second vehicle, a time-of-flight (TOF) of the first spatially and/or distance defined light-based communication signal, or a heading of the first vehicle relative to a second vehicle;
processing a second spatially and/or distance defined light-based communication signal at the first vehicle, wherein the second spatially and/or distance defined light-based communication signal includes data pertaining to at least one of a position of the first vehicle relative to a third vehicle, a time-of-flight (TOF) of the second spatially and/or distance defined light-based communication signal, or a heading of the first vehicle relative to a third vehicle;
generating a first message for transmission to the second vehicle, the first message based at least in part on the first spatially and/or distance defined light-based communication signal;
generating a second message for transmission to the third vehicle, the second message based at least in part on the second spatially and/or distance defined light-based communication signal, the second message being different than the first message;
causing directional transmission of the first and second messages, wherein the first and second messages are transmitted by an array of individual light sources disposed on a complex surface, the process further comprising varying direction of message transmission by varying which of the individual light sources on the complex surface are illuminated;
receiving, at the receiver of the first vehicle, light emitted from a light source within the vehicle environment or roadway environment, wherein the light source is not part of a light-based communication system; and
determining a status of the light source from one or more characteristics of the light emitted from the light source, wherein the one or more characteristics comprise at least one of wavelength, color, amplitude, intensity, and emission pattern.

17. The computer program product of claim 16, wherein the first message includes data pertaining to the speed of the first vehicle, and the second message includes data pertaining to the speed and relative position of the first vehicle.

18. The computer program product of claim 16, wherein the first message and the second message are transmitted simultaneously.

19. The computer program product of claim 16, the process further comprising at least one of:
relaying the first spatially and/or distance defined light-based communication signal from the first vehicle to another vehicle; and
relaying the second spatially and/or distance defined light-based communication signal from the first vehicle to another vehicle.

20. The computer program product of claim 16, wherein at least one of:
the first message is inclusive of the first spatially and/or distance defined light-based communication signal and additional data received from the first vehicle; and
the second message is inclusive of the second spatially and/or distance defined light-based communication signal and additional data received from the first vehicle.

21. The computer program product of claim 16, the process further comprising at least one of:
outputting a control signal to control a vehicle function;
outputting a notification to a display hosted by the first vehicle; and
outputting a notification to speaker hosted by the first vehicle.

22. The computer program product of claim 16, wherein the first spatially and/or distance defined light-based communication signal comprises data pertaining to at least one of:
a position and orientation of a transmitter from which the spatially and/or distance defined light-based communication signal originated;
a position/orientation of a receiver hosted by the first vehicle;
a distance between a transmitter from which the spatially and/or distance defined light-based communication signal originated and a receiver hosted by the first vehicle;
a proximity of a receiver hosted by the first vehicle to a transmitter from which the spatially and/or distance defined light-based communication signal originated; and/or
a heading of a transmitter from which the spatially and/or distance defined light-based communication signal originated.

23. The computer program product of claim 16, further comprising:
processing a third spatially and/or distance defined light-based communication signal at the first vehicle, wherein the third spatially and/or distance defined light-based communication signal includes data pertaining to at least one of a position of the first vehicle relative to a fixed node, a time-of-flight (TOF) of the third spatially and/or distance defined light-based communication signal, or a heading of the first vehicle relative to a fixed node, wherein the fixed node is one of a traffic signal, a street light, or an electroluminescent sign.

* * * * *